United States Patent
Risser et al.

(10) Patent No.: US 7,060,934 B2
(45) Date of Patent: Jun. 13, 2006

(54) HIGH RESOLUTION LASER BEAM DELIVERY APPARATUS

(75) Inventors: Christian J. Risser, Scottsdale, AZ (US); Edwin W. Gorham, Phoenix, AZ (US); Yefim P. Sukhman, Scottsdale, AZ (US)

(73) Assignee: Universal Laser Systems, Inc., Scottsdale, AZ (US)

( * ) Notice: Subject to any disclaimer, the term of this patent is extended or adjusted under 35 U.S.C. 154(b) by 0 days.

(21) Appl. No.: 11/002,049

(22) Filed: Dec. 1, 2004

(65) Prior Publication Data

US 2005/0121428 A1  Jun. 9, 2005

Related U.S. Application Data

(60) Provisional application No. 60/527,222, filed on Dec. 4, 2003.

(51) Int. Cl.
*B23K 26/06* (2006.01)
*B23K 26/08* (2006.01)

(52) U.S. Cl. .......................... 219/121.73; 219/121.78; 219/121.8

(58) Field of Classification Search ........... 219/121.78, 219/121.79, 121.8, 121.73, 121.74, 121.75
See application file for complete search history.

(56) References Cited

U.S. PATENT DOCUMENTS

| | | | | | |
|---|---|---|---|---|---|
| 4,358,659 | A | * | 11/1982 | Spohnheimer | 219/121.62 |
| 5,889,256 | A | * | 3/1999 | Osanai | 219/121.74 |
| 6,175,096 | B1 | * | 1/2001 | Nielsen | 219/121.72 |
| 6,410,882 | B1 | * | 6/2002 | Okada | 219/121.64 |

FOREIGN PATENT DOCUMENTS

| | | | | | |
|---|---|---|---|---|---|
| JP | 62-84889 | A | * | 4/1987 | 219/121.74 |
| JP | 2-284787 | A | * | 11/1990 | 219/121.75 |
| JP | 3-32484 | A | * | 2/1991 | 219/121.75 |
| JP | 7-68396 | A | * | 3/1995 | |

* cited by examiner

*Primary Examiner*—Geoffrey S. Evans
(74) *Attorney, Agent, or Firm*—Perkins Coie, LLP

(57) ABSTRACT

A laser material processing system and method focus a laser beam to a smaller spot size with a high power density using a movable beam expander to provide high resolution laser beam for engraving and/or cutting. A movable beam focusing assembly containing a beam expanding optics and a beam focusing optics is a part of a motion system providing a high power density focused beam within the material processing area minimizing size and weight of the laser beam positioning optics and avoiding the problems inherent in handling and positioning a larger diameter beam.

15 Claims, 6 Drawing Sheets

HIGH RESOLUTION LASER BEAM DELIVERY APPARATUS

CROSS-REFERENCE TO RELATED APPLICATIONS

This application claims priority to U.S. provisional patent application No. 60/527,222, filed on Dec. 4, 2003, which is incorporated herein by reference in its entirety.

BACKGROUND OF THE INVENTION

1. Field of the Invention

This invention relates to laser systems and in particular to a laser material processing system providing high resolution and power density of the laser beam.

2. Description of the Related Art

Laser technology has numerous applications in different scientific and commercial settings. For example, laser-based imaging and fabrication, such as engraving and cutting to form artwork or other ornamental images including lettering, has become very popular, especially in the creation of artwork on various materials, such as plastics, wood, rubber and rubber-like material, paper, etc.

As the state of the art of such laser technology and applications has progressed, one trend in the laser engraving field has been to produce finer and more precise detail in the engraved and/or cut images. Typically, commercially available laser beam delivery systems easily provide resolutions at which a laser beam may be positioned on the order of about 0.01 mm. using known X-Y based motion systems. An example of a known laser beam delivery system 10 is illustrated in FIG. 1, having a movable beam focusing assembly 34 which travels back and forth as shown by arrows 14 on a moveable arm 15 forming an X-axis, the arm 15 moving back and forth as shown by arrows 12 on stationary arms 13 and 16, which may be rails, forming a Y-axis and positioned over a workpiece 18 of material for engraving, etching, or cutting artwork or the like with a laser beam 20 output from a laser source 22.

The system 10 operates by directing the output laser beam 20 along paths 24–28 parallel to the Y-axis and the X-axis, respectively, using mirrors and/or other known optical elements. A final mirror 30 and a final focusing lens 32 are located in beam focusing assembly 34 of the system 10, such that the final mirror 30 directs the beam 20 out of the plane of the X-Y motion system to the final focusing lens 32. The final focusing lens 32 then focuses the resulting beam to a focal spot 36 on the subject material workpiece 18.

In an example embodiment, the laser source 22 is a typical carbon dioxide laser, providing an output beam between about 3 mm. and about 5 mm. in size, which may be focused to a focal spot typically no smaller than about 0.1 mm. at a typical focal length of about 50 mm., or about 10 times larger than the resolution at which known motion systems may position the focal spot 36. Such configurations of known laser systems generally limit the detail which may be achieved in the cut or engraved image on the workpiece 18.

One obvious solution to such limitations in detail is to focus the output beam 20 from the laser source 22 to a smaller spot. Traditionally, such focusing is done by employing a beam expander, using known optical elements, to expand the output beam from the laser source 22 by about 2 times to about 10 times. With D being the input beam diameter, the proposed solution increases D, which then allows the beam to be focused to a spot about 2 times to about 10 times smaller. Such focusing decreases the focal spot diameter d, and so such use of a beam expander provides smaller focal spot diameters than could be achieved with an unexpanded beam, as determined by the following equation:

$$d_{(1/e^2)} = 4\lambda f/(\pi D_{(1/e^2)})$$

where f is the focal length, $\lambda$ is the laser wavelength, and $d_{(1/e^2)}$ and $D_{(1/e^2)}$ correspond to the focal spot diameter d and the input beam diameter D measured at the $1/e^2$ points of the laser beam output from the laser source.

In the prior art, a beam expander would typically be placed at a convenient location in the beam path close to the position where the beam 20 exits the laser source 22. However, such an implementation presents a problem in that an expanded beam with a larger diameter requires larger and often heavier optics to direct the expanded beam along the axes and arms of the motion system. In addition to increasing costs, such a need for larger and heavier optics has other undesirable effects on the design of the motion system, such as requiring larger clearances for the beam, as well as stronger and/or larger motors to move the larger optics and support structures of the motion system, which ultimately drives up the purchase and maintenance costs to implement the laser beam delivery system 10.

BRIEF SUMMARY OF THE INVENTION

A laser material processing system and method focuses a laser beam to a smaller spot size with a high power density using a movable beam expander to provide high resolution laser beam for engraving and/or cutting. A movable beam focusing assembly containing at least one beam expanding optical element and at least one beam focusing optical element is a part of a motion system providing a high power density focused beam within the material processing area minimizing size and weight of the laser beam positioning optics and avoiding the problems inherent in handling and positioning a larger diameter beam.

BRIEF DESCRIPTION OF THE SEVERAL VIEWS OF THE DRAWINGS

Preferred embodiments of the invention are disclosed hereinbelow with reference to the drawings, wherein.

DETAILED DESCRIPTION OF THE INVENTION

Figure 1:
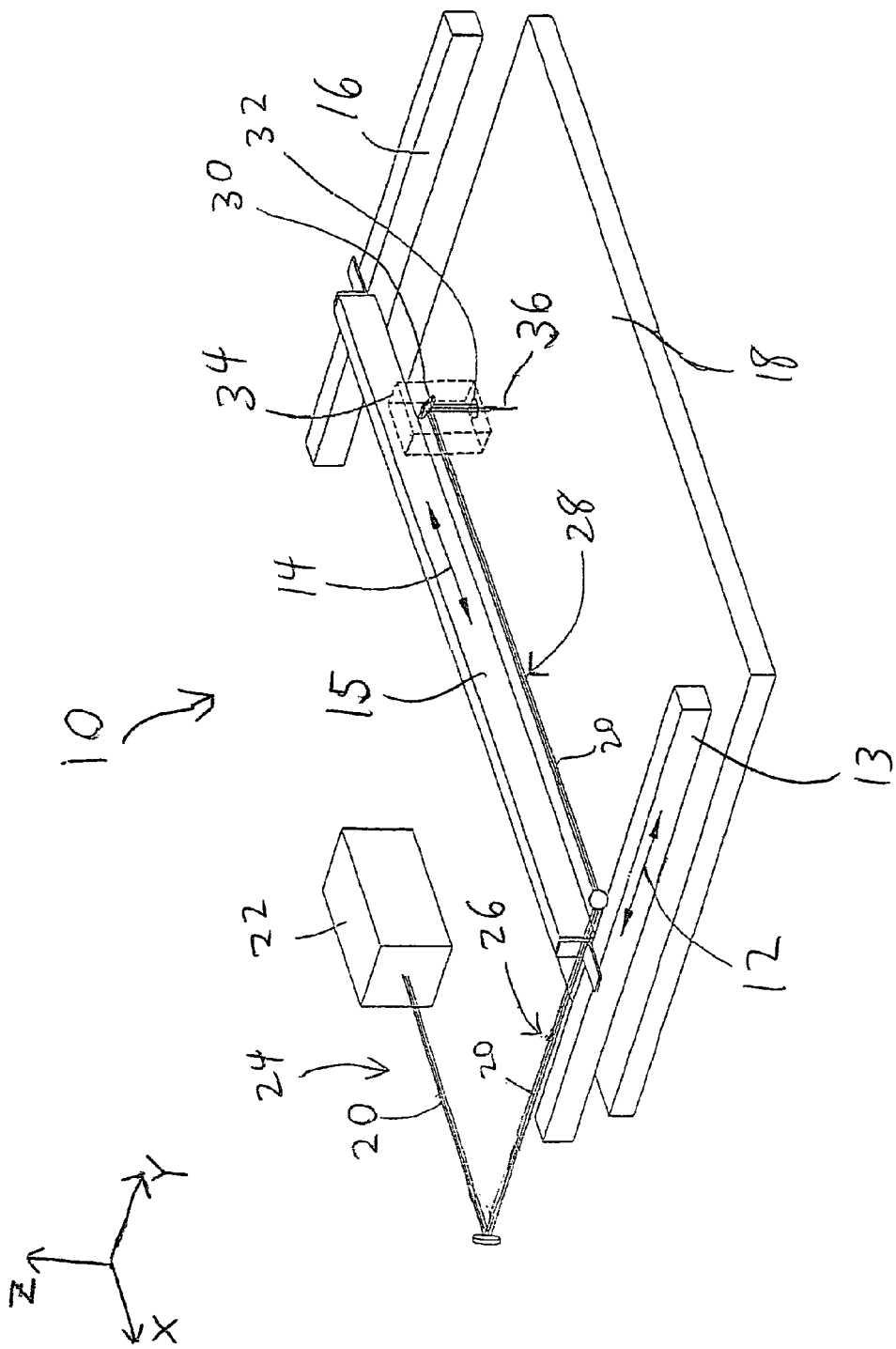
FIG. 1 is a top perspective view of a laser beam delivery machine with a motion system of the prior art.

As shown in FIGS. 2–8, a laser material processing system 40 and method include a beam focusing assembly 42, shown in greater detail in FIGS. 3–6, contained in a moveable housing 44 for engraving, cutting, or etching a workpiece 18 composed of any known material capable of being modified by engraving, cutting, or etching by a laser beam. As shown in a partial cutaway view of the housing 44 in FIGS. 2–3, at least one beam expanding optical element is positioned within the housing 44 to receive a laser beam 20 and to generate therefrom a substantially divergent beam 48. The at least one beam expanding optic includes any known optical elements for expanding a laser beam.

In a preferred embodiment, the at least one beam expanding optical element includes a beam expanding lens 50. As used herein in connection with the present invention, the term "lens" is defined herein to include any known device for controlling and/or modifying the characteristics and/or direction of radiation including a laser beam. The beam focusing assembly 42 moves back and forth as shown by arrows 14 on the arm 15 of the motion system forming an X-axis and the arm 15 moves back and forth as shown by arrows 12 on the stationary arms 13 and 16 forming a Y-axis with the final beam focusing region 52 located at the comparable position of the final beam focusing assembly 34 of the prior art laser beam delivery system 10 shown in FIG. 1. In an example embodiment, the beam expanding lens 50 expands the beam by about 3× magnification, and the focusing lens 32 focuses the substantially divergent beam 48 as a resulting focused beam 54 to a spot significantly smaller than the focal spot from an unexpanded beam using the laser beam delivery system 10 of the prior art lacking the beam expanding optical element in the final beam focusing assembly 34 shown in FIG. 1.

The housing 44 of the beam focusing assembly 42 may include additional optical elements such as the mirror 30 to redirect the substantially divergent beam 48 to the focusing lens 32. Other lenses or mirrors for use in expanding and/or focusing the substantially divergent beam 48 may also be included in addition to the beam expanding lens 50.

By utilizing the beam expanding lens 50 located in the beam focusing assembly 42 and therefore substantially adjacent to the final focusing region positionable anywhere on the workpiece 18, the laser material processing system 40 and method of the present invention maintains the output laser beam to be relatively small until just before the final focus is to occur, and then the beam is expanded to substantially fill the focusing lens 32, thus achieving a smaller focal spot.

Figure 3:
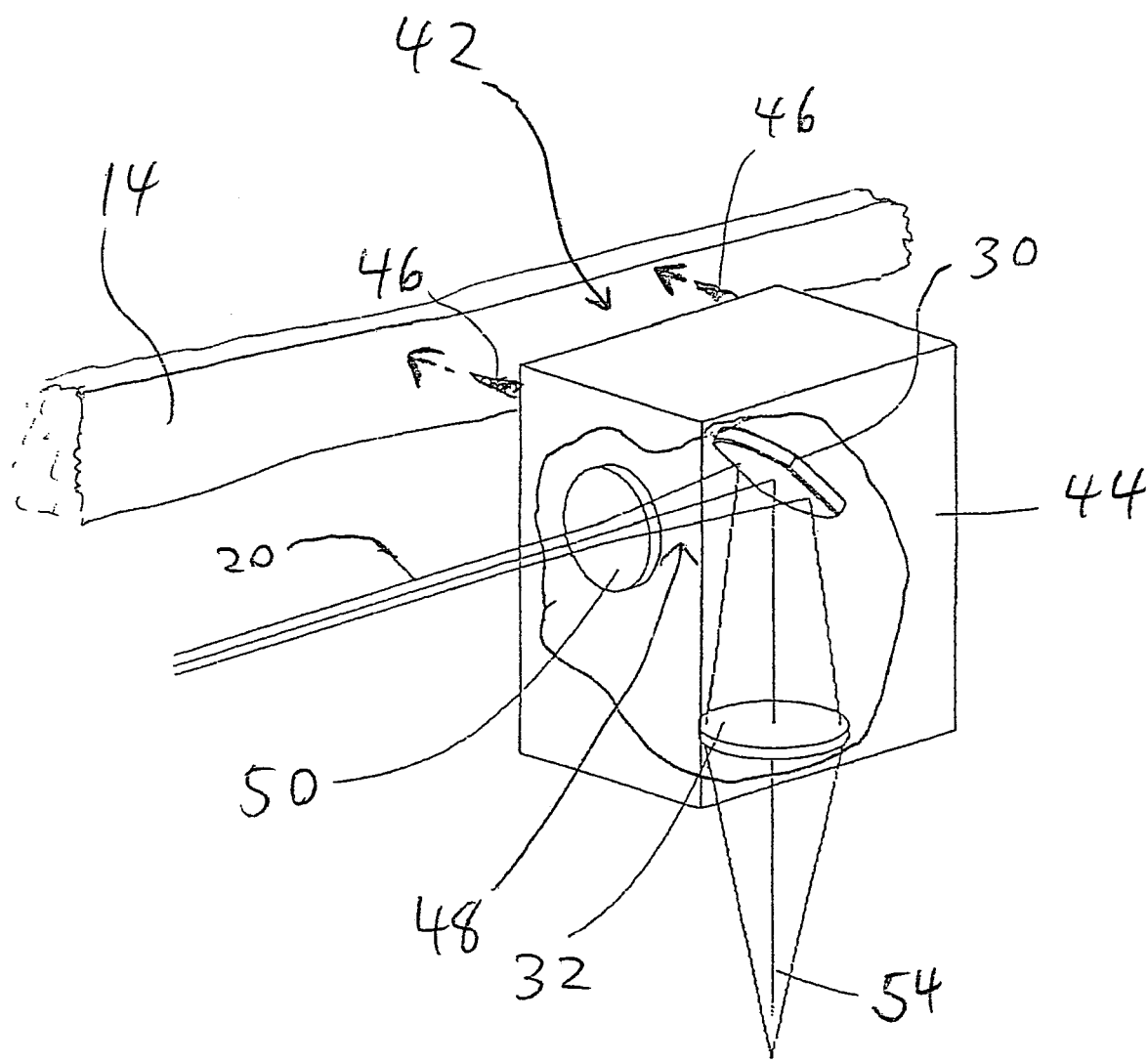
FIG. 3 is a top perspective and partial cut-away view of the beam expander assembly for use in the laser beam delivery system of FIG. 2.
Figure 4:
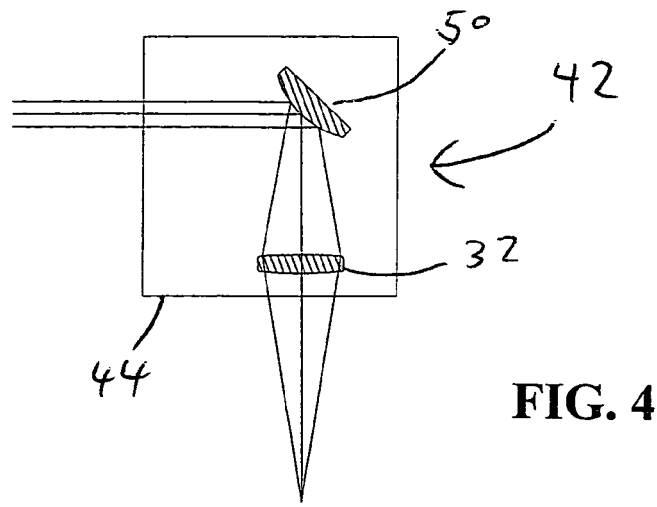
FIGS. 4–6 are side cross-sectional views of alternative embodiments of the beam expander assembly of FIG. 3.
Figure 5:
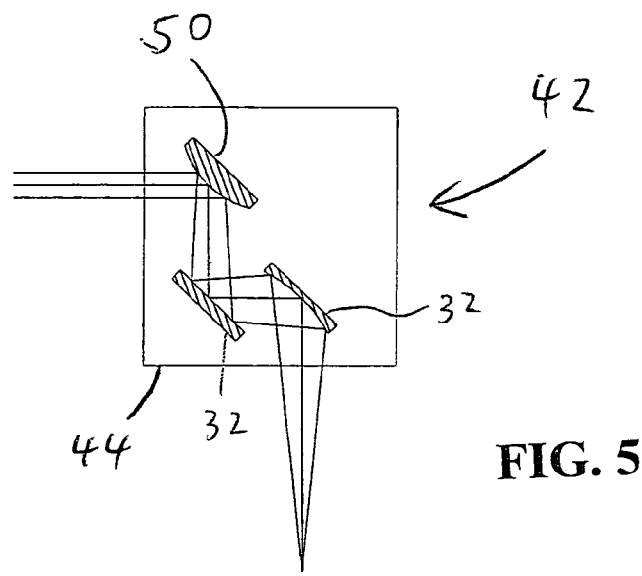
Figure 6:
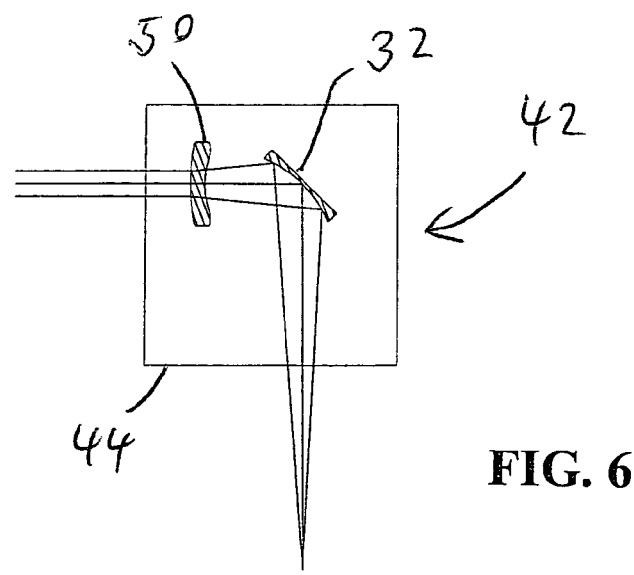

While FIG. 3 shows the preferred embodiment of the beam focusing assembly in which the beam expanding lens 50 is a refractive optical element and the beam focusing lens is a refractive optical element, other embodiments may be considered and included in the present invention. FIG. 4 shows the beam focusing assembly in cross section where the beam expanding lens 50 is a reflective optical element and the beam focusing lens 32 is a refractive optical element. FIG. 5 shows the beam focusing assembly in cross section where the beam expanding lens 50 is a reflective optical element and the beam focusing lens 32 is at least one reflective optical element. FIG. 6 shows the beam focusing assembly in cross section where the beam expanding lens 50 is a refractive optical element and the beam focusing lens 32 is a reflective optical element.

Figure 7:
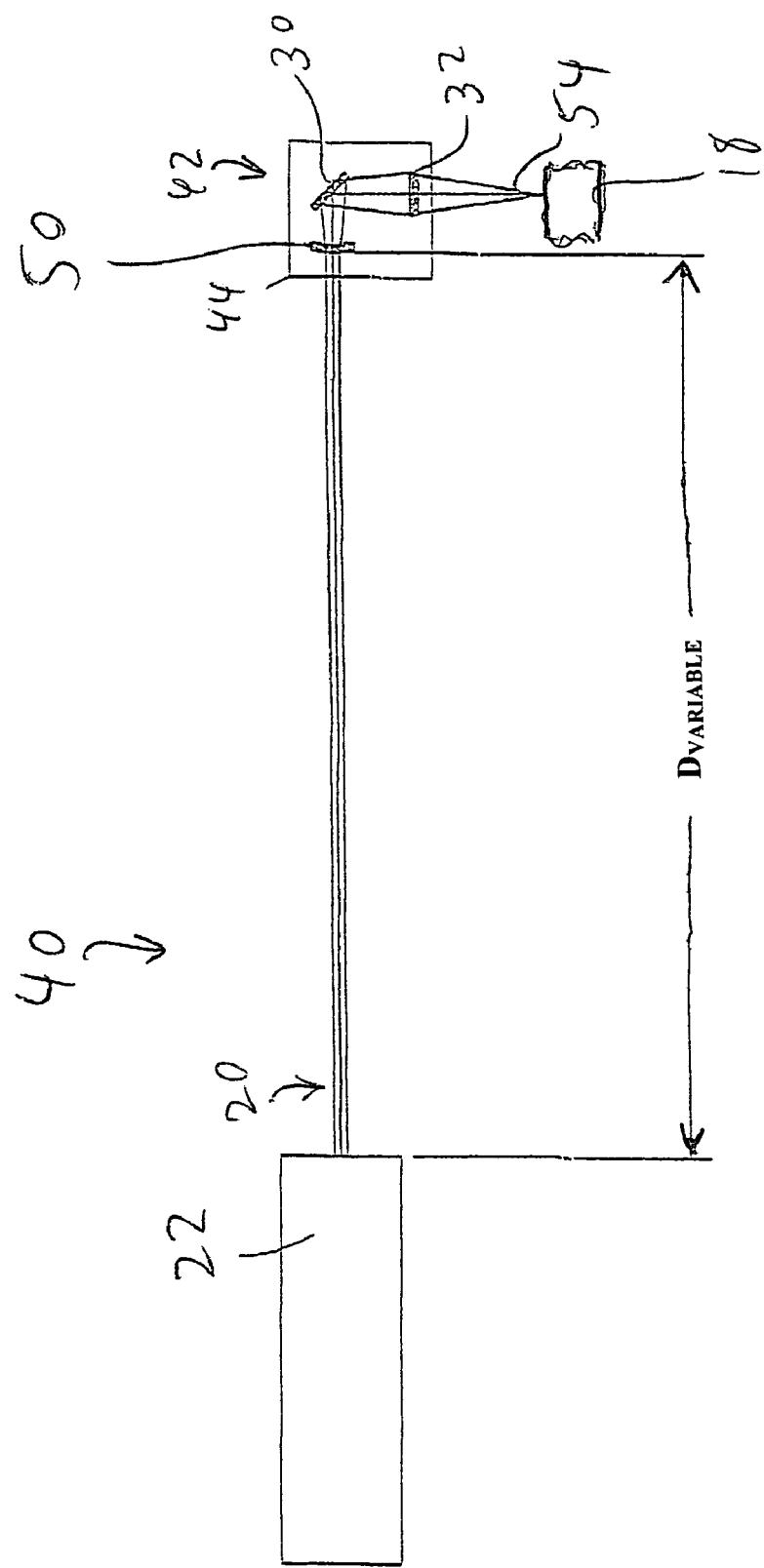
FIG. 7 is a side cross-sectional view of a laser delivery system of FIG. 2 incorporating the beam expander assembly of FIG. 3.
Figure 8:
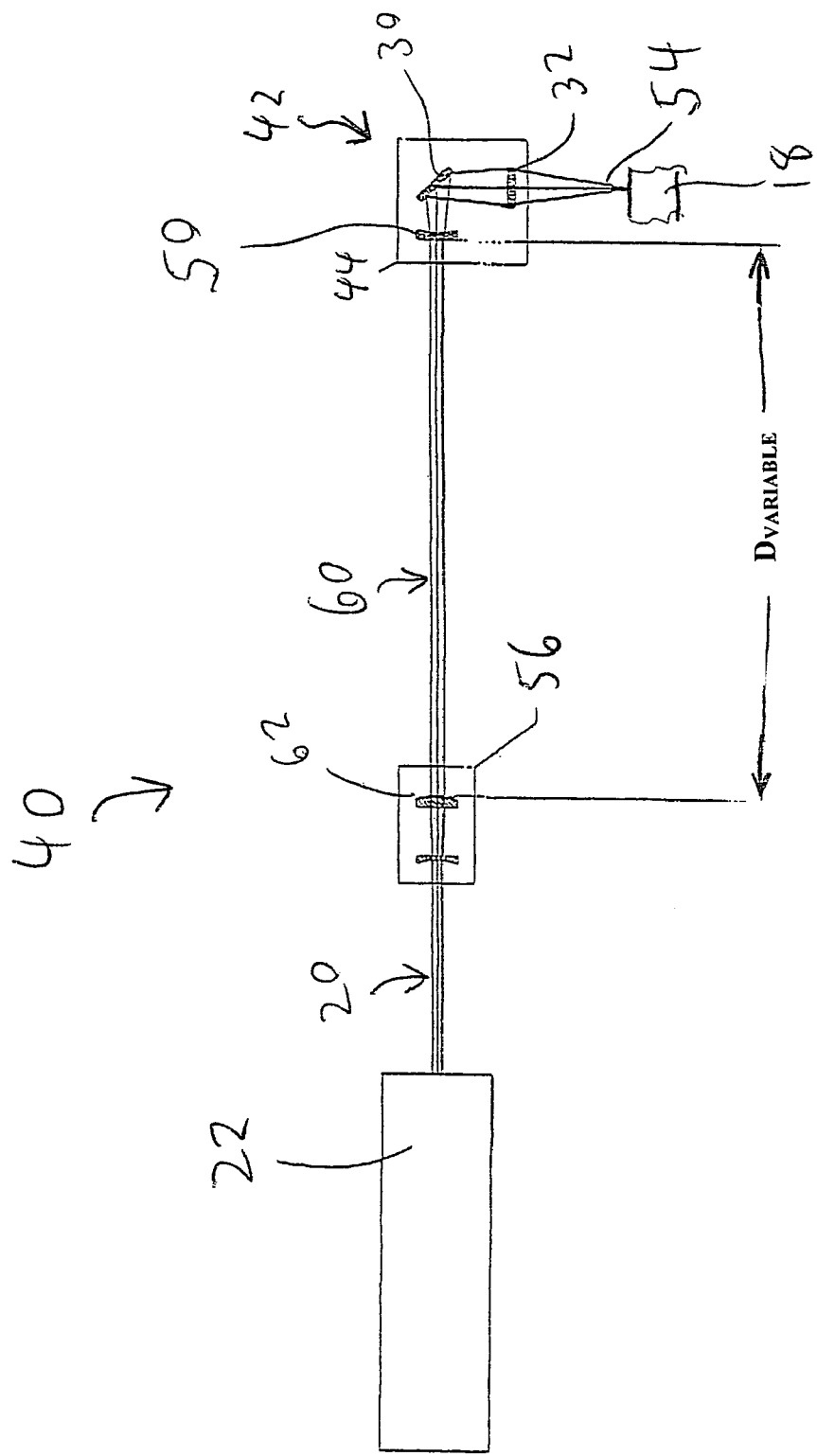
FIG. 8 is a side cross-sectional view of an alternative embodiment of the laser delivery system of FIG. 2 incorporating a collimator.

As shown in FIGS. 7–8, the laser material processing system 40 and method of the present invention is shown in a side cross-sectional view in a simplified form omitting the various optical elements in the paths 24–28 of the laser beam 20. In the example embodiment shown in FIG. 7, the beam focusing assembly 42 is positioned substantially close to the workpiece 18 and relatively far downstream from the laser source 22. Accordingly, the beam expanding lens 50 moves with the beam focusing assembly 42 of the motion system so the distance $D_{VARIABLE}$ between the laser source 22 and the beam expanding lens 50 changes, while the various optical elements in the paths 24–28, shown in FIG. 2, continue to direct the laser beam 20 to the beam focusing assembly 42. Accordingly, the resulting focused beam 54 and its focal spot is movable in the X-Y plane to be directed to any desired location on the surface of the workpiece 18.

In an alternative embodiment shown in FIG. 8, the laser material processing system 40 and method of the present invention optionally includes a collimator 56 to compensate for divergence of the output laser beam 20. The performance of the beam expanding lens 50 of the present invention is dependent on the diameter of the output laser beam entering the beam expanding lens 50. Since the beam from a laser is typically divergent to some degree, as the beam focusing assembly 42 moves; on the motion system, the beam focusing assembly 42 may encounter a varying size or diameter of the output laser beam incident on the beam expanding lens 50.

In some implementations of the present invention, such divergence of the output laser beam incident on the beam expanding lens 50 may be minimal or within tolerance levels to perform nominally to generate the resulting focused beam 54 with its focal spot on the workpiece 18 with little or no degradation of resolution. For example, in laser material processing systems 40 with relatively small X-Y fields or dimensions, the effect of divergence may not produce any noticeable effect in the size of the focal spot as the beam focusing assembly in the X-Y motion system travels.

Alternatively, to compensate for such divergence of the laser beam, especially in X-Y motion systems with relatively large X-Y fields, the collimator 56 reduces the divergence of the output laser beam 20, and so prevents the spot size of the output laser beam 20 from varying too much from one end of the X and Y travel to the other, for example, as $D_{VARIABLE}$ varies.

Figure 2:
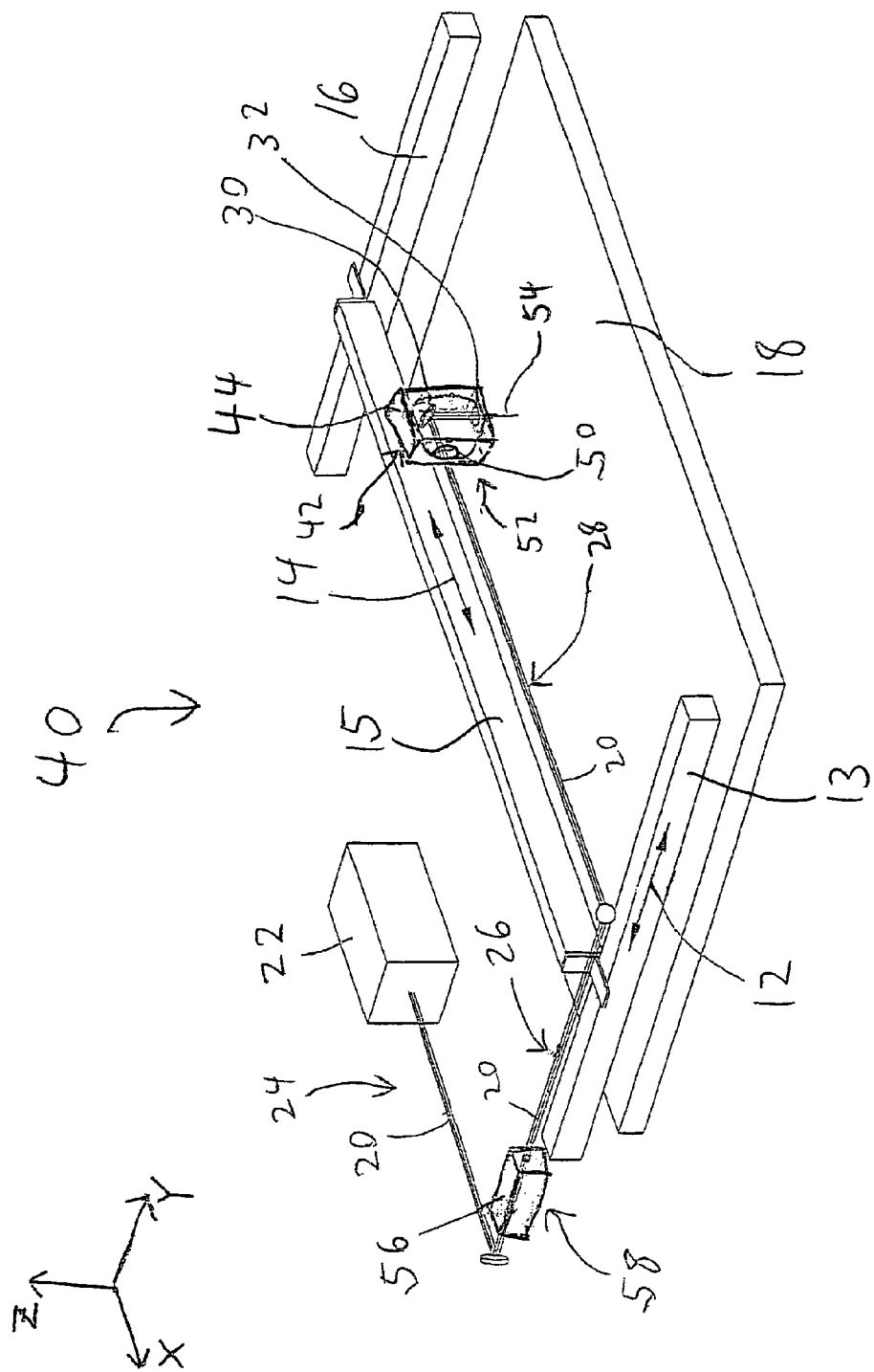
FIG. 2 is a top perspective view of a laser beam delivery system of the present invention.

In a preferred embodiment, the collimator 56 is positioned substantially adjacent to the laser source 22, for example, to be fixedly positioned in a region 58 of the laser material processing system 40 shown in FIG. 2. In the present invention, shown in FIG. 8, the optional collimator 56 generates a collimated beam 60 which is incident on the beam expanding lens 50. Accordingly, in the alternative embodiment shown in FIG. 8, $D_{VARIABLE}$ is measured between the final optic 62 of the collimator and the beam expanding lens 50 of the beam focusing assembly 42, as shown in FIG. 8.

While the preferred embodiment of the present invention has been shown and described herein, it will be obvious that such embodiment is provided by way of example only. Numerous variations, changes and substitutions will occur to those skilled in the art without departing from the invention herein. Accordingly, it is intended that the invention be limited only by the spirit and scope of the appended claims.

What is claimed is:

1. A laser material processing system comprising:
    a laser source generating an output laser beam, characterized by parameters including an output laser beam diameter and an output laser beam divergence;
    a work area to contain a workpiece composed of material to be processed;
    a motion system for positioning the output laser beam within the work area to a plurality of positions corresponding to X and Y coordinates on the workpiece, the motion system includes a movable beam focusing assembly containing:

at least one beam expanding optical element for transforming the output laser beam into a substantially diverging laser beam of increased diameter; and at least one beam focusing optical element fixedly positioned relative to the at least one beam expanding optical element for transforming the substantially diverging laser beam of increased diameter into a focused laser beam of high power density;

the moveable beam focusing assembly thus locating the at least one beam expanding optical element and the at least one beam focusing optical element substantially adjacent to the plurality of positions corresponding to X and Y coordinates on the workpiece, thereby maintaining the output laser beam diameter until entering the movable beam focusing assembly and providing a smaller focal spot of the focused laser beam of high power density incident upon the plurality of locations within the work area.

2. The laser material processing system of claim 1, wherein the movable beam focusing assembly contains:
at least one refractive beam expanding optical element; and
at least one refractive beam focusing optical element.

3. The laser material processing system of claim 1, wherein the movable beam focusing assembly contains:
at least one reflective beam expanding optical element; and at least one refractive beam focusing optical element.

4. The laser material processing system of claim 1, wherein the movable beam focusing assembly contains:
at least one reflective beam expanding optical element; and at least one reflective beam focusing optical element.

5. The laser material processing system of claim 1, wherein the movable beam focusing assembly contains:
at least one refractive beam expanding optical element; and at least one reflective beam focusing optical element.

6. The laser material processing system of claim 1, further comprising:
a collimator positioned between the laser source and the movable focusing beam assembly to modify the output laser beam divergence and the output laser beam diameter.

7. A high resolution laser beam delivery apparatus, comprising:
a laser source configured for generating a laser beam having a beam diameter;
an arm movably coupled to a set of stationary arms, the arm being configured to travel in a first direction; and
a beam focusing assembly movably coupled to the arm, the beam focusing assembly being configured to travel in a second direction generally perpendicular to the first direction, wherein the beam focusing assembly comprises:

a first optical element configured for receiving and transforming the laser beam such that a desired expansion ratio of the beam diameter is achieved;

a second optical element fixedly positioned relative to the first optical element and configured for receiving the transformed laser beam from the first element and substantially reducing the expanded beam diameter.

8. The high resolution laser beam delivery apparatus of claim 7, wherein the first optical element comprises at least one optical element selected from the group consisting of a refractive beam expanding element and a reflective beam expanding element, and wherein the second optical element comprises at least one optical element selected from the group consisting of a refractive beam focusing element and a reflective beam focusing element.

9. The high resolution laser beam delivery apparatus of claim 7, wherein the beam focusing assembly further comprises a reflecting optical element placed between the first and second optical elements.

10. The high resolution laser beam delivery apparatus of claim 7, further comprising a collimator positioned between the laser source and the movable focusing beam assembly.

11. The high resolution laser beam delivery apparatus of claim 10, wherein the collimator is positioned substantially adjacent to the laser source.

12. A method for processing a workpiece using laser, comprising:
generating a laser beam having a beam diameter;
receiving and expanding the laser beam such that a desired expansion ratio of the beam diameter is achieved by using a first optical element;
focusing the expanded laser beam by using a second optical element; and
positioning the focused laser beam on a workpiece by moving a carriage containing both the first and second optical elements while a relative position between the first and second optical elements is fixed.

13. The method of claim 12, further comprising collimating the laser beam using a collimator before the laser beam is received by the first optical element.

14. The method of claim 12, further comprising:
reflecting the expanded laser beam using at least one reflecting optical element; and
delivering the expanded laser beam to the second optical element.

15. The method of claim 12, wherein positioning the focused laser beam on a workpiece comprises positioning the focused laser beam according to a X-Y coordinate.

* * * * *